(12) United States Patent  (10) Patent No.: US 9,223,306 B2
Northrup et al.  (45) Date of Patent:  Dec. 29, 2015

(54) SYSTEM AND METHOD UTILIZING AN EDITING INITIALIZATION BLOCK IN A PART PROGRAM EDITING ENVIRONMENT IN A MACHINE VISION SYSTEM

(75) Inventors: Ryan Northrup, Renton, WA (US); Dahai Yu, Redmond, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 987 days.

(21) Appl. No.: 13/297,182

(22) Filed: Nov. 15, 2011

(65) Prior Publication Data

US 2013/0120567 A1  May 16, 2013

(51) Int. Cl.
  *H04N 7/18* (2006.01)
  *G05B 19/4093* (2006.01)

(52) U.S. Cl.
  CPC .. *G05B 19/4093* (2013.01); *G05B 2219/32128* (2013.01); *G05B 2219/36499* (2013.01); *G05B 2219/37208* (2013.01)

(58) Field of Classification Search
  CPC ....................................................... H04N 7/18
  USPC .................. 348/142, E7.085, 79; 250/559.19
  See application file for complete search history.

(56) References Cited

U.S. PATENT DOCUMENTS

| | | | |
|---|---|---|---|
| 4,835,730 A | 5/1989 | Shimano | |
| 5,481,712 A | 1/1996 | Silver | |
| 5,537,456 A | 7/1996 | Sauter | |
| 6,016,467 A | 1/2000 | Newsted | |
| 6,510,434 B1 | 1/2003 | Anderson | |
| 6,542,180 B1 | 4/2003 | Wasserman | |
| 6,636,211 B2 | 10/2003 | Chartier | |
| 7,055,092 B2 | 5/2006 | Yardumian | |
| 7,207,017 B1 | 4/2007 | Tabery | |
| 7,324,682 B2 | 1/2008 | Wasserman | |
| 7,376,904 B2 | 5/2008 | Cifra | |
| 7,454,053 B2 | 11/2008 | Bryll | |
| 7,590,276 B2 | 9/2009 | Delaney | |
| 7,643,907 B2 | 1/2010 | Fuhlbrigge | |
| 7,689,634 B2 | 3/2010 | Agarwal | |
| 7,864,178 B2 | 1/2011 | Marini | |
| 8,028,085 B2 | 9/2011 | Elien | |

(Continued)

OTHER PUBLICATIONS

"QVPAK 3D CNC Vision Measuring Machine: Operation Guide," Version 2.0, Manual No. 4911GB, Series No. 359, Mitutoyo Corporation & Micro Encoder Inc., Kanagawa, Japan, Sep. 1996, 86 pages.

(Continued)

*Primary Examiner* — Tejal Gami
(74) *Attorney, Agent, or Firm* — Christensen O'Connor Johnson Kindness PLLC

(57) ABSTRACT

A method is provided for defining and utilizing an editing initialization block for a part program. The part program comprises a plurality of steps for taking measurements of a part and is displayed in an editing interface. An option is provided in the editing interface for selecting which steps are in an editing initialization block. After the part program has been saved, at a later time when the part program is recalled for editing, the editing initialization block may be run before additional steps are added to the part program. At least some of the data that would have been obtained by one or more of the initial part program steps that are not in the editing initialization block may be based on estimated data that is related to (e.g., modified based on) data determined from running the editing initialization block.

20 Claims, 9 Drawing Sheets

(56) References Cited

U.S. PATENT DOCUMENTS

| | | |
|---|---|---|
| 8,111,905 B2 | 2/2012 | Campbell |
| 8,111,938 B2 | 2/2012 | Bryll |
| 2005/0109959 A1* | 5/2005 | Wasserman et al. ..... 250/559.19 |
| 2006/0150148 A1 | 7/2006 | Beckett |
| 2006/0178778 A1 | 8/2006 | Fuhlbrigge |
| 2007/0067290 A1 | 3/2007 | Makela |
| 2007/0150102 A1 | 6/2007 | Park |
| 2007/0250204 A1 | 10/2007 | Ould |
| 2009/0164202 A1 | 6/2009 | Lönnemark |
| 2010/0103679 A1 | 4/2010 | Lee |
| 2010/0158343 A1 | 6/2010 | Bryll |
| 2010/0269094 A1 | 10/2010 | Levenshteyn |
| 2011/0103679 A1 | 5/2011 | Campbell |
| 2013/0027538 A1* | 1/2013 | Ding et al. ...................... 348/79 |
| 2013/0120553 A1 | 5/2013 | Delaney |
| 2013/0123945 A1 | 5/2013 | Saylor |
| 2013/0125044 A1 | 5/2013 | Saylor |

OTHER PUBLICATIONS

"QVPAK 3D CNC Vision Measuring Machine: User's Guide," Version 7.1, 2d ed., Manual No. 99MCB225A, Series No. 359, Mitutoyo Corporation & Micro Encoder Inc., Kanagawa, Japan, Sep. 2003, 370 pages.

* cited by examiner

SYSTEM AND METHOD UTILIZING AN EDITING INITIALIZATION BLOCK IN A PART PROGRAM EDITING ENVIRONMENT IN A MACHINE VISION SYSTEM

FIELD OF THE INVENTION

The invention relates generally to machine vision inspection systems, and more particularly to methods for creating and editing part programs in such systems.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

Video tools (or "tools" for short) and other graphical user interface features may be used manually to accomplish manual inspection and/or machine control operations (in "manual mode"). Their set-up parameters and operation can also be recorded during learn mode, in order to create automatic inspection programs, or "part programs." Video tools may include, for example, edge/boundary detection tools, autofocus tools, shape or pattern matching tools, dimension measuring tools, and the like. Other graphical user interface features may include dialog boxes related to data analysis, step and repeat loop programming, and the like. For example, such tools are routinely used in a variety of commercially available machine vision inspection systems, such as the QUICK VISION® series of vision systems and the associated QVPAK® software, discussed above.

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Editing a part program can be a complex task. For example, if a user saves a partially completed part program and has to return at a later time to finish the programming, if changes have occurred in the interim (e.g., changes in environmental conditions, the part being inadvertently moved on the stage, etc.), then the entire part program may need to be rerun before any additional steps are added. A need exists for editing operations and features which overcome these and other deficiencies to allow more efficient, intuitive, and flexible editing of part programs for precision machine vision inspection systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method is provided for editing a part program on a machine vision inspection system. The machine vision inspection system includes an imaging portion, a stage for holding one or more parts in a field of view (FOV) of the imaging portion, a motion control portion that moves the imaging portion relative to the stage, a display that displays a user interface (UI), and a controller.

In accordance with one aspect of the invention, the method begins by defining a plurality of initial part program steps and displaying corresponding part program step representations in an editing interface of the user interface. An editing initialization portion is then provided and operated to define at least some of the plurality of initial part program steps as editing initialization steps for the part program. The editing initialization portion is then operated such that when a part program is recalled for editing, if the part program includes defined editing initialization steps then the editing initialization portion performs at least one of (a) prompting the user with a user interface feature indicating the editing initialization steps may be run, and (b) running the editing initialization steps before allowing the addition of steps to the part program.

In accordance with another aspect of the invention, the editing initialization portion can be configured by a user to define the editing initialization steps. In one embodiment, the editing initialization portion comprises a drop down menu that is provided in the editing interface with a selection for defining the editing initialization steps. In one implementation, the set of the editing initialization steps is defined as an editing initialization block which may be determined by the user indicating the last initial part program step that is an editing initialization step.

In accordance with another aspect of the invention, the editing initialization portion comprises an indicator which is at least one of a color bar, a delimiting pointer, or a text highlighting portion. The user may utilize such an indicator to define in the editing interface which of the initial part program steps are editing initialization steps. In one embodiment, when the part program is recalled for editing, a similar indicator is displayed in the user interface to indicate which steps are the editing initialization steps.

In accordance with another aspect of the invention, a pop-up block is provided as the user interface feature which asks the user whether or not the editing initialization steps should be run. In one embodiment, such a user interface feature may be automatically provided to the user at a time when the part program is recalled and an indication is made that additional part program steps are to be added.

In accordance with another aspect of the invention, the editing initialization steps comprise part program steps that move the imaging portion relative to the stage. In one embodiment, such steps may determine at least one of an origin coordinate or an orientation of the part that is used as a reference for measuring other features on the part. In one particular implementation, such steps may reestablish a part coordinate system for the part so as to compensate for any inadvertent movement of the part on the stage since the last part program steps were performed. In one embodiment, initial part program steps that would otherwise move the imaging portion relative to the stage except that they are not editing initialization steps are not run.

In accordance with another aspect of the invention, when a part program is recalled for editing and the editing initialization steps are run, at least some of the data that would have been obtained by one or more of the initial part program steps that are not editing initialization steps may be based on estimated data that is related to (e.g., modified based on) data determined from running the editing initialization steps. In the absence of the defined editing initialization steps, placing such "non-initialization steps" in an acceptable condition for editing would otherwise require certain time consuming processes (e.g., hardware interactions such as moving the stage, edge detection operations, focusing operations, lighting adjustments, pattern matching, etc.) to be interactively controlled in an awkward and error-prone time consuming manner.

It should be appreciated that providing a simple, time-efficient and robust editing environment for machine vision part programs is significantly more difficult than providing an adequate editing environment for editing simple computer programs, because potentially dangerous motions and mechanical collisions must be revealed and considered during the program editing process. In addition, providing a simple, time-efficient and robust editing environment for editing machine vision part programs is significantly more difficult than providing an adequate editing environment for editing assembly robot programs and the like (e.g., programs which control a robot's geometric motions and actuators, and the like), because unique workpiece geometries and surface finishes require that unpredictable and subtle lighting and imaging effects be revealed and considered and customized during the program editing process. In addition, machine vision inspection systems are required to perform operations that determine relationships between features that are measured and inspected at different locations on a workpiece and at different points in time, by respective operations that may be dispersed throughout a part program. Thus, providing a robust editing environment that allows a relatively unskilled user to edit an existing part program beginning at an arbitrary point within the program is a difficult task. It should be appreciated based on the disclosure herein that the editing initialization portion and methods disclosed herein are of particular utility in contributing to a solution to the combination of problems outlined above, which are unique to providing a time-efficient and robust editing environment for part programs for a general purpose machine vision inspection system.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
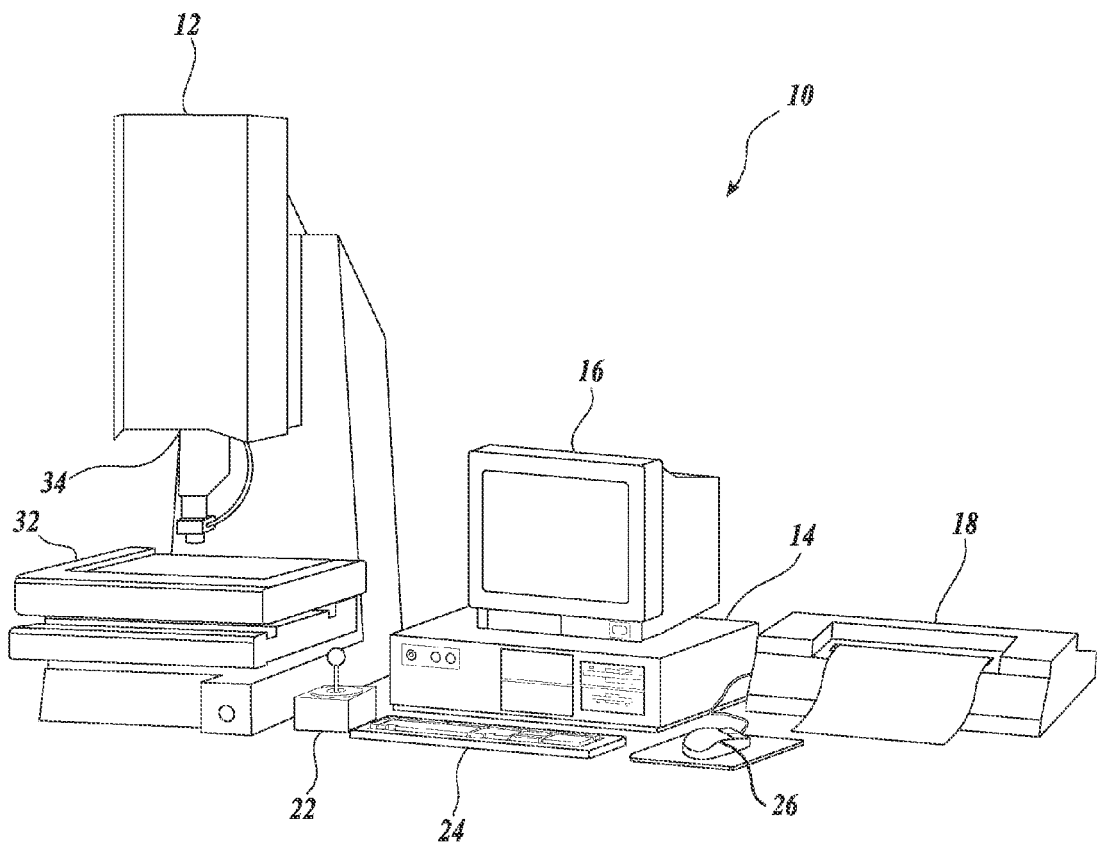
FIG. 1 is a diagram showing various typical components of a general purpose precision machine vision inspection system.

FIG. 1 is a block diagram of one exemplary machine vision inspection system 10 usable in accordance with the methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053 and 7,324,682, and U.S. Patent Application Publication Nos. 2010/0158343 and 2011/0103679, which are each incorporated herein by reference in their entireties.

With regard to the editing of part programs for machine vision systems such as that shown in FIG. 1, the refined editing interface features and related methods disclosed herein, can provide for more efficient, intuitive, and flexible editing operations, particularly for novice or infrequent users.

Figure 2:
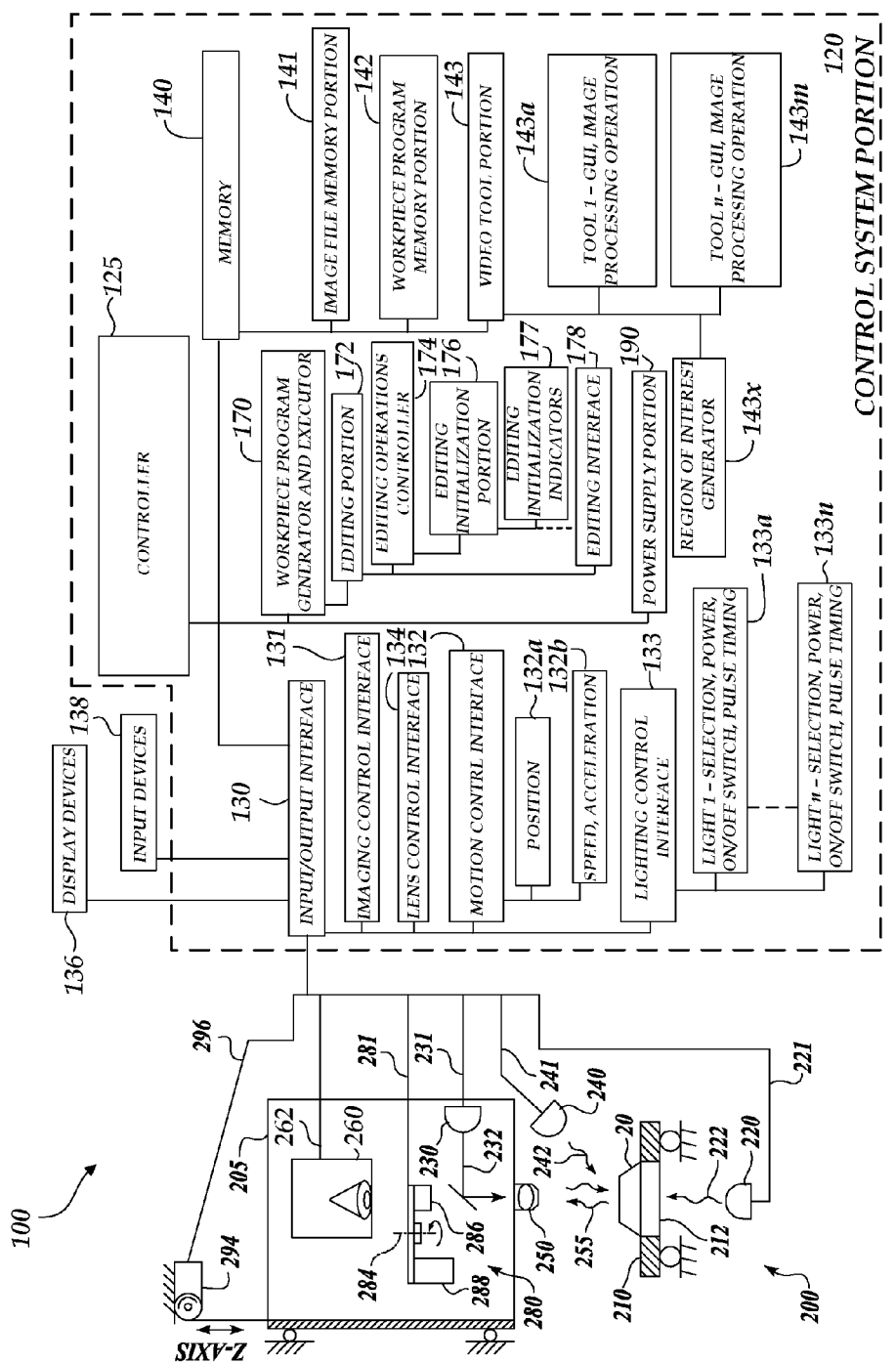
FIG. 2 is a block diagram of a control system portion and a vision components portion of a machine vision inspection system similar to that of FIG. 1, and including features according to this invention.

FIG. 2 is a block diagram of a control system portion 120 and a vision components portion 200 of a machine vision inspection system 100 similar to the machine vision inspection system of FIG. 1, and including features according to the present invention. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. The optical assembly portion 205 is controllably movable along a Z-axis that is generally orthogonal to the X and Y axes, by using a controllable motor 294, as described further below.

A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20. One or more of a stage light 220, a coaxial light 230, and a surface light 240 may emit source light 222, 232, or 242, respectively, to illuminate the workpiece or workpieces 20. The source light is reflected or transmitted as workpiece light 255, which passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

In various exemplary embodiments, the optical assembly portion 205 is movable in the vertical Z-axis direction relative to the workpiece stage 210 using a controllable motor 294 that drives an actuator, a connecting cable, or the like, to move the optical assembly portion 205 along the Z-axis to change the focus of the image of the workpiece 20 captured by the camera system 260. The term Z-axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements.

In various embodiments according to this invention, the workpiece program generator and executor 170 includes an editing portion 172, which provides or activates various operations and user interface features related to editing a part program, as will be described in greater detail below. It will be appreciated that the terms "workpiece program" and "part program" may be used interchangeably herein. In general, the editing portion 172 includes an editing operations controller 174 which controls the operations for the editing functions, and an editing interface 178 that provides the user interface features for the editing functions. The editing operations controller 174 includes an editing initialization portion 176 that provides editing initialization features for the editing functions, as will be described in more detail below. The editing initialization portion 176 includes editing initialization indicators 177, which define certain editing initialization parameters that are utilized by the editing operations controller 174, as will be described in more detail below. The editing initialization portion 176 and the editing initialization indicators 177 are also linked to the editing interface 178, wherein indicators are provided in the editing interface of the respective editing initialization parameters and/or other related parameters.

It will be appreciated that in certain embodiments, the editing initialization indicators 177 may have certain features and operations similar to those of a video tool. In other words, as will be described in more detail below with respect to FIGS. 5 and 6, when a user sets one of the indicators, doing so may both define parameters that are utilized by the editing operations controller 174 (e.g., defining which part program steps are within an editing initialization block), while at the same time providing an indicator in the editing interface 178 on the screen that indicates the respective parameter (e.g., indicating the final part program step and/or what part program steps are within an editing initialization block). In certain implementations, certain of the editing initialization indicators 177 may be provided as user interface features in the editing interface 178 on the screen that define parameters for, and receive parameters from, a user interaction (e.g., defining which part program steps are within an editing initialization block, receiving an indication from the user as to whether the editing initialization block should be run, etc.).

As shown in FIG. 2, the input/output interface 130 includes an imaging control interface 131, a motion control interface 132, a lighting control interface 133, and a lens control interface 134. The motion control interface 132 may include a position control element 132a, and a speed/acceleration control element 132b, although such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100.

The memory 140 includes an image file memory portion 141, a workpiece program memory portion 142 that may include one or more part programs, or the like, and a video tool portion 143. The video tool portion 143 includes video tool portion 143a and other video tool portions (e.g., 143m), which determine the GUI, image processing operation, etc., for each of the corresponding video tools. Many known video tools are included in commercially available machine vision inspection systems, such as the QUICK VISION® series of vision systems and the associated QVPAK® software, discussed above. The video tool portion 143 also includes a region of interest (ROI) generator 143x that supports automatic, semi-automatic and/or manual operations that define various ROIs that are operable in various video tools included in the video tool portion 143.

In general, the memory portion 140 stores data usable to operate the vision system components portion 200 to capture or acquire an image of the workpiece 20 such that the acquired image of the workpiece 20 has desired image characteristics. The memory portion 140 may also store inspection result data, may further store data usable to operate the machine vision inspection system 100 to perform various inspection and measurement operations on the acquired images (e.g., implemented, in part, as video tools), either manually or automatically, and to output the results through the input/output interface 130. The memory portion 140 may also contain data defining a user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various user interface features that are usable to perform inspection operations, and/or to create and/or modify part programs, to view the images captured by the camera system 260, and/or to directly control the vision system components portion 200. In particular, according to various exemplary embodiments of the present invention, the display devices 136 and input devices 138 are used to present various user interface features usable to allow efficient, intuitive, and flexible editing of part programs on the machine vision inspection system 100.

In various exemplary embodiments, when a user utilizes the machine vision inspection system 100 to create a part program for the workpiece 20, the user generates part program instructions either by explicitly coding the instructions automatically, semi-automatically, or manually, using a workpiece programming language, and/or by generating the instructions by operating the machine vision inspection system 100 in a learn mode to provide a desired image acquisition training sequence. For example, a training sequence may comprise positioning a workpiece feature in the field of view (FOV), setting light levels, focusing or autofocusing, acquiring an image, and providing an inspection training sequence applied to the image (e.g., using video tools). The learn mode operates such that the sequence(s) are captured or recorded and converted to corresponding part program steps (i.e., instructions). These part program steps, when the part program is executed, will cause the machine vision inspection system to reproduce the trained image acquisition and inspection operations to automatically inspect a workpiece or workpieces matching the workpiece used when creating the part program.

Related editing features and functions are also described in patent applications entitled "Machine Vision System Program Editing Environment Including Real Time Context Generation Features" (Ser. No. 13/297,232); "Machine Vision System Program Editing Environment Including Synchronized User Interface Features" (61/560,278); and "Machine Vision System Editing Environment For A Part Program In Which A Continuous Stream Of Image Acquisition Operations Are Performed During A Run Mode" (Ser. No. 13/297,220), each of which is filed concurrently herewith and hereby incorporated by reference.

Figure 3:
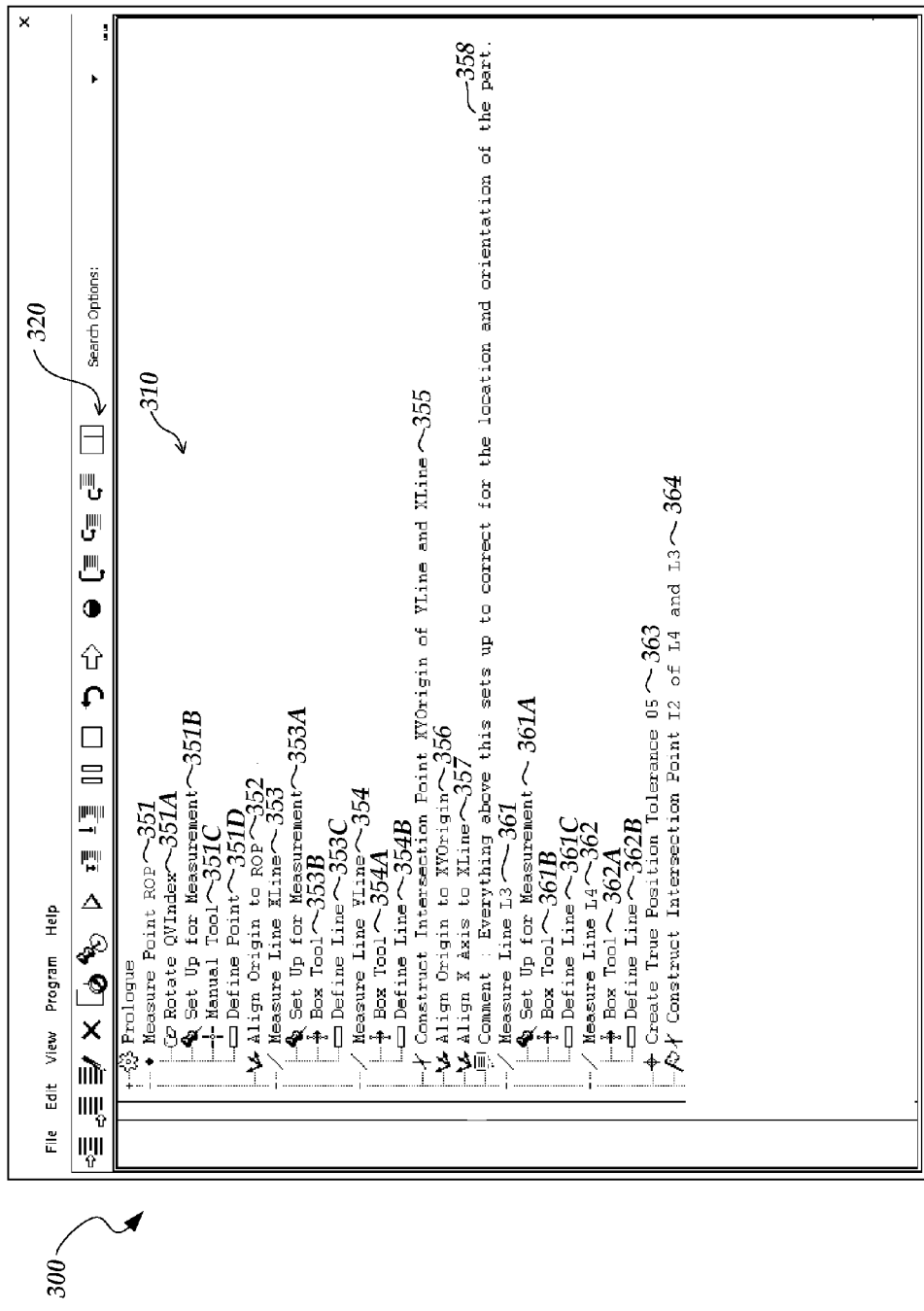
FIG. 3 is a diagram of an editing interface including a representation of a part program that has a plurality of initial part program steps.

FIG. 3 is a diagram of an editing interface 300 including a representation of a part program 310 that has a plurality of initial part program steps 351-364. The editing interface 300 also includes various measurement and/or operation selection bars such as the selection bar 320. The operation of the specific steps of the part program 310 will be described in more detail below with respect to FIG. 4.

Figure 4:
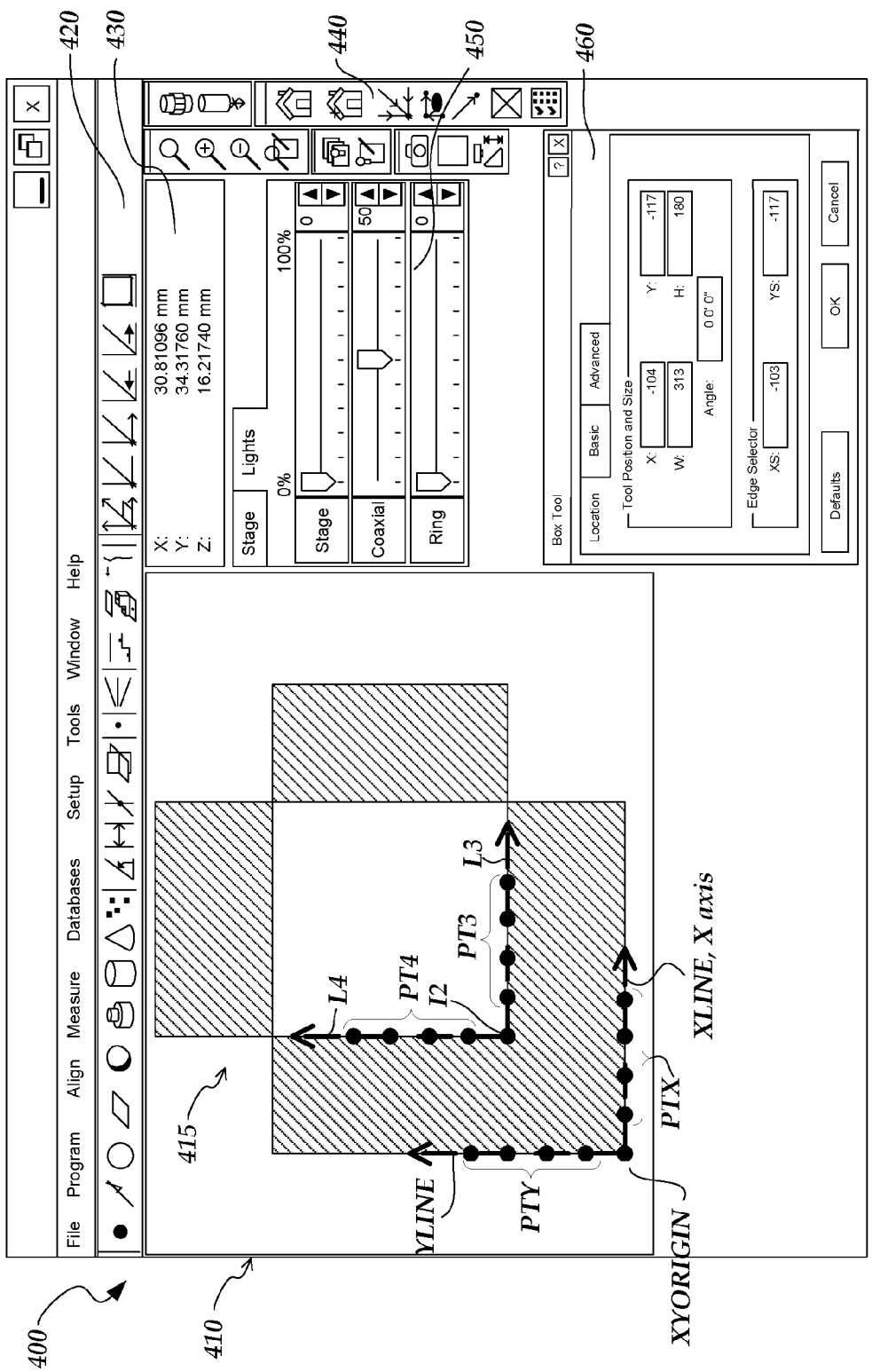
FIG. 4 is a diagram of a user interface including a workpiece on which the part program steps of FIG. 3 are performed.

FIG. 4 is a diagram illustrating a user interface 400 including a field of view window 410 with a workpiece 415. The user interface 400 also includes various measurement and/or operation selection bars such as the selection bars 420 and 440, a real-time X-Y-Z (position) coordinate window 430, a light control window 450, and a video tool parameter box 460. As will be described in more detail below, various features on the workpiece 415 are determined in accordance with related part program steps of FIG. 3, such as sets of points PTX, PTY, PT3 and PT4, lines XLINE, YLINE, L3 and L4, an origin point XYORIGIN, and an intersection point I2.

The following description will make reference to both the initial part program step representations 351-364 of FIG. 3, and the corresponding features on the workpiece 415 of FIG. 4. The part program 310 begins with the step representations 351 and 352, which indicate that the user manually selects a location on the workpiece 415 to act as a rough origin point ROP, and then aligns the origin to the rough origin point ROP. More specifically, the substeps 351A, 351B, 351C and 351D indicate that the user sets up and utilizes a manual tool to define the rough origin point ROP and the step representation 352 aligns the origin with the rough origin point ROP. The step representation 353 then measures the line XLINE. More specifically, the sub-steps 353A and 353B indicate that the user sets up and utilizes a box tool to determine the edge points PTX. The functions and operations of box tools and other edge detection video tools are known in the art and are described in more detail in the previously incorporated references. The edge points PTX that are determined by the box tool are then utilized by the sub-step 353C to define the line XLINE. Similarly, the step representation 354 measures the line YLINE, wherein the sub-step 354A indicates that the user utilizes a box tool to determine the edge points PTY, which are then utilized by the sub-step 354B to define the line YLINE.

The step representation 355 then constructs an intersection point XYORIGIN at the intersection of the lines XLINE and YLINE. The step representation 356 then commands the machine vision system to align the origin to the point XYORIGIN. The step representation 357 then commands the machine vision system to align the X axis for the workpiece 415 to the line XLINE. As will be described in more detail below with respect to FIG. 5, and as indicated by the comment line 358, the operations of the step representations 351-357 establish the correct location and orientation of the workpiece 415 for performing additional measurements.

The step representation 361 then measures the line L3. More specifically, the sub-steps 361A and 361B indicate that the user sets up and utilizes a box tool to determine the edge points PT3, which are then utilized by the sub-step 361C to define the line L3. Similarly, the step representation 362 measures the line L4, wherein the sub-step 362A indicates that the user utilizes a box tool to determine the edge points PT4, which are then utilized by the sub-step 362B to define the line L4. The step representation 363 indicates that the user defines a selected position tolerance and the step representation 364 constructs an intersection point I2 where the previously determined lines L3 and L4 intersect. Once these initial part program steps 351-364 have been programmed by a user, the user may elect to set an editing initialization block marker, as will be described in more detail below with respect to FIG. 5.

Figure 5:
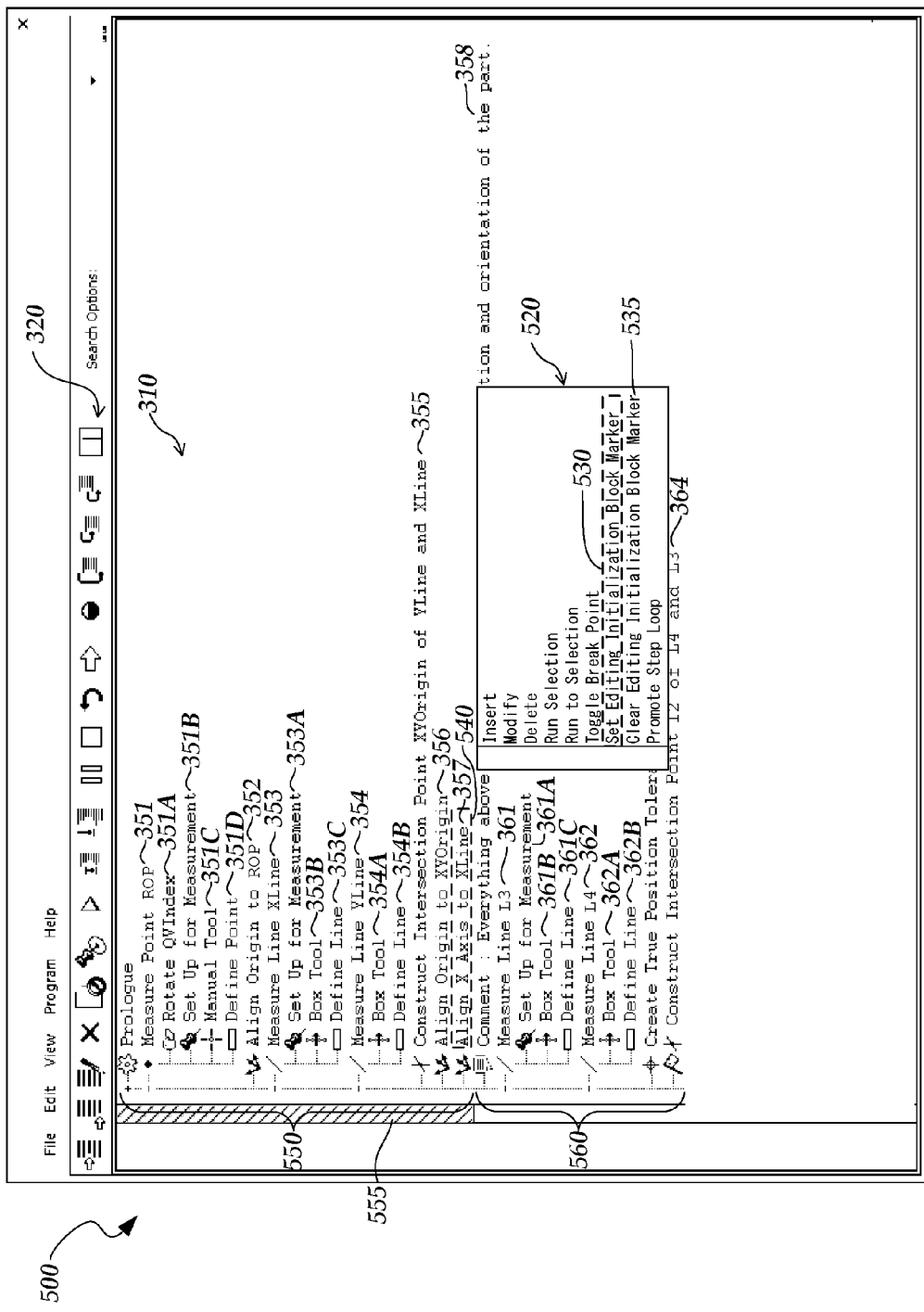
FIG. 5 is a diagram of an editing interface including the representation of the part program of FIG. 3 and further including a drop down menu for defining an editing initialization block.

FIG. 5 is a diagram of an editing interface 500 including the representation of the part program 310 of FIG. 3 and further including a drop down menu 520 for defining an editing initialization block to be saved with the part program. As shown in FIG. 5, the drop down menu 520 includes a selection 530 for setting an editing initialization block marker, and a selection 535 for clearing an editing initialization block marker. In one embodiment, the drop down menu 520 may be provided when a user selects a particular step representation (e.g., in the illustration of FIG. 5, the user has selected the step representation 357 by using a mouse to move a selector over the step representation 357 and then by right clicking on it). The step representation that is selected with the editing initialization block marker (e.g., step representation 357) may be indicated by a selector box (e.g., a selector box 540 as illustrated in FIG. 5), or highlighting or other indicator method.

Once the user designates the step representation 357 with the editing initialization block marker, this designates that all of the steps preceding and up to step representation 357 (i.e., step representations 351-357) are editing initialization steps which make up an editing initialization block 550. The step representation 357 is therefore determined to be the last initial part program step that is an editing initialization step. In one embodiment, an editing initialization indicator may be provided in the editing interface 500 that indicates that each of the step representations 351-357 are editing initialization steps. In the specific example illustration of FIG. 5, a color bar 555 (shown with cross hatch) is provided next to the step representations 351-357 to indicate that they are in the editing initialization block 550. In alternative embodiments, other editing initialization indicators may be utilized for indicating the editing initialization steps (e.g., a delimiting pointer, delineating markers, highlighting of the actual steps rather than a bar next to the steps, etc.). In one embodiment, when the part program 310 is saved, the indication of which steps are editing initialization steps is also saved.

In some embodiments, the editing initialization steps comprise part program steps that move the imaging portion relative to the stage. For example, as shown in FIG. 5, the step representations 351A, 351B and 353A may involve steps that move the imaging portion relative to the stage.

It will be appreciated that the remaining initial part program step representations 361-364 which follow the editing initialization block marker indicated by the selector box 540 and which are therefore not included in the editing initialization block 550, may not be run in the same manner when the editing initialization block 550 is run, as will be described in more detail below. In one embodiment, the step representations 361-364 are designated as being in a remaining steps block 560.

As will be described in more detail below, in one embodiment, the editing initialization block 550 may be utilized to address certain changes in conditions that may occur during the editing process for a part program. For example, if after a user saves a part program, the user leaves the work station and returns at a later time, in the interim certain changes may have occurred (e.g., the part being inadvertently moved on the stage, etc.) that may affect the editing of the part program. However, due to the amount of time that may be required for rerunning all of the previous steps of a part program (particularly those steps that require certain time-consuming processes such as hardware interactions, etc.), a user may desire to only rerun the steps that are required for establishing the desirable conditions for continuing the edits. In accordance with the present invention, a user may designate the editing initialization block 550 which comprises steps that have been determined to be necessary for returning to the desirable conditions for continuing the edits. The editing initialization steps of the editing initialization block 550 comprise initial part program steps that will reestablish a part coordinate system for the part, so as to compensate for any inadvertent movement of the part on the stage since the last part program steps were performed.

Figure 6:
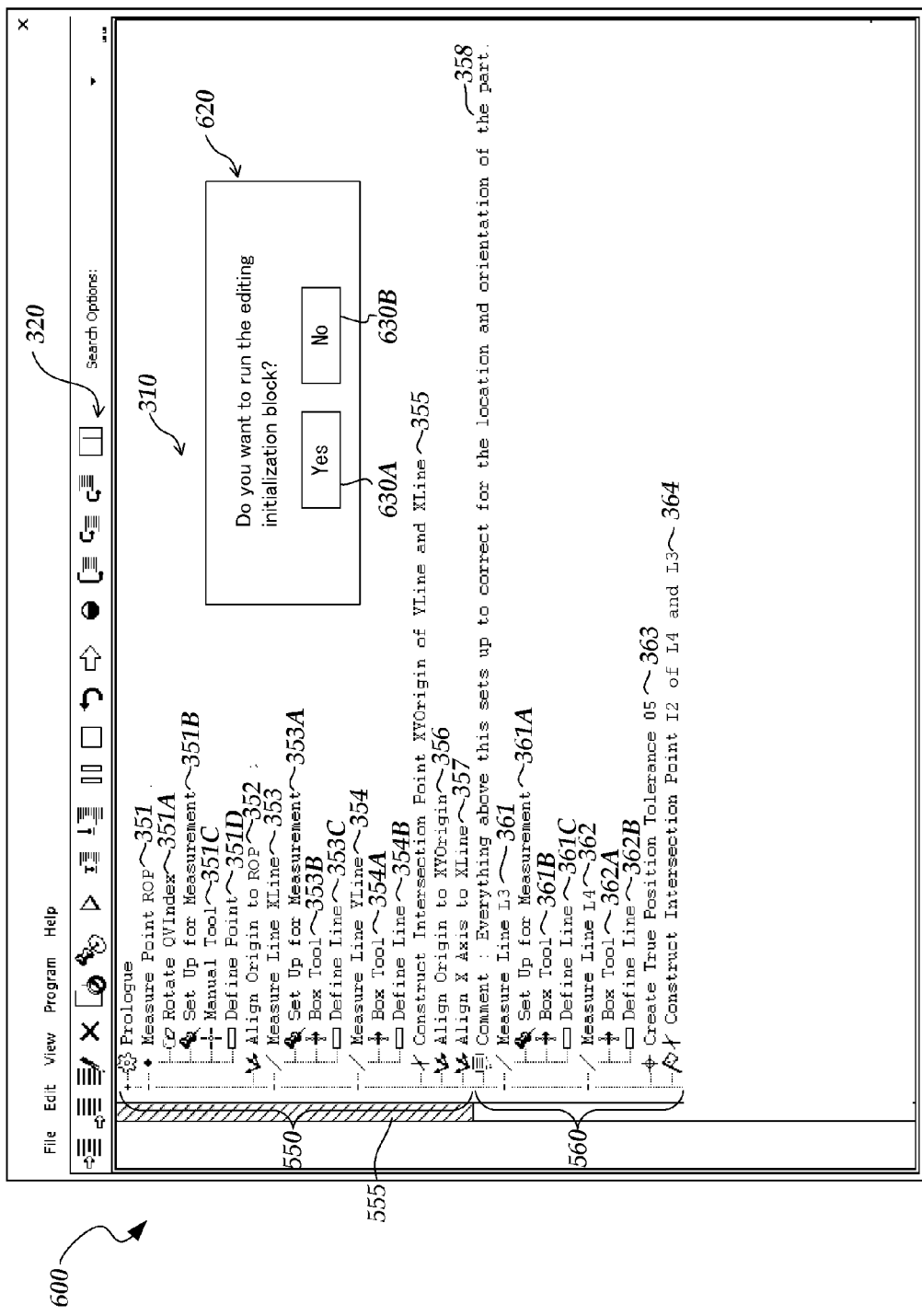
FIG. 6 is a diagram of an editing interface including the representation of the part program of FIG. 3 and further including a pop-up block for allowing a user to choose whether to run the editing initialization block after the part program has been recalled for editing.

FIG. 6 is a diagram of an editing interface 600 including the representation of the part program 310 of FIG. 3 and further including a pop-up block 620 for allowing a user to choose whether to run the editing initialization block after the part program has been recalled for editing. As shown in FIG. 6, the pop-up block 620 prompts a user that the editing initialization steps may be run and queries the user as to whether the editing initialization block should be run again, and provides a yes button 630A and a no button 630B. If the yes button 630A is selected, then the editing initialization block 550 is run again prior to the adding of additional steps to the part program, as will be described in more detail below with respect to FIGS. 7 and 8. If the no button 630B is selected, then additional steps may be added to the part program without rerunning the editing initialization block 550. In certain implementations, the user may also elect to rerun the entire part program 310, prior to adding additional steps to the part program.

It will be appreciated that in an alternative embodiment, the editing initialization block 550 may be set to run automatically when the part program 310 is recalled for editing. In one implementation, this may be done by a default setting, or a user may be provided with an option when the part program is saved for whether or not to have the editing initialization block run automatically when the part program is recalled for editing. In certain implementations, it may be desirable to not have the editing initialization block be run automatically (e.g., it may be startling to a user if the machine vision system begins to move on its own without any prompting or warning, etc.).

Figure 7:
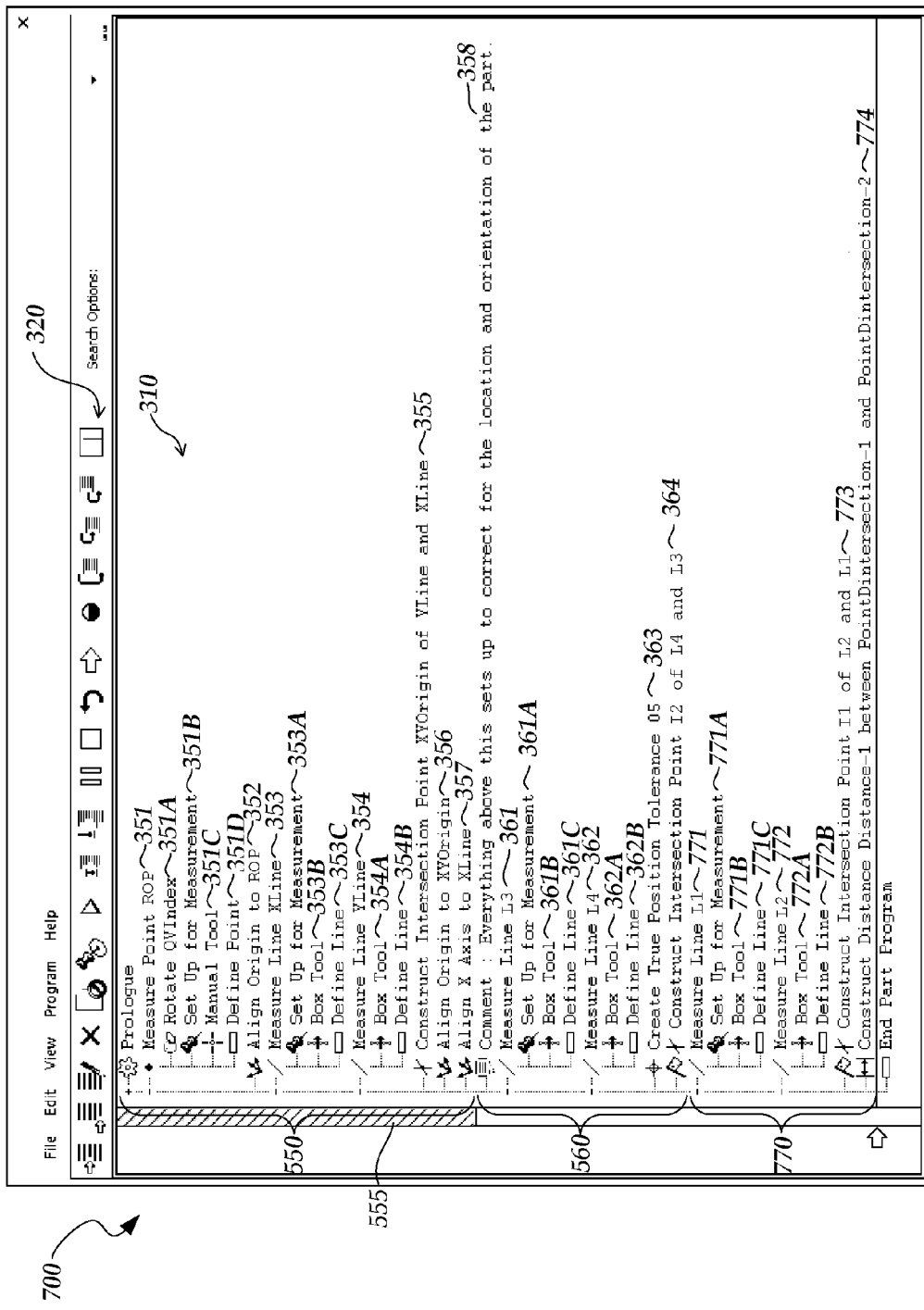
FIG. 7 is a diagram of an editing interface including the representation of the part program of FIG. 3 and further including additional part program step representations that have been added to the part program by a user after the editing initialization block has been run.

FIG. 7 is a diagram of an editing interface 700 including the representation of the part program 310 of FIG. 3 and further including an added steps block 770 which includes additional part program step representations 771-774 that have been added to the part program after the editing initialization block 550 has been run. The specific operations of the running of the editing initialization block 550 and the step representations 771-774 will be described in more detail below with respect to FIG. 8.

Figure 8:
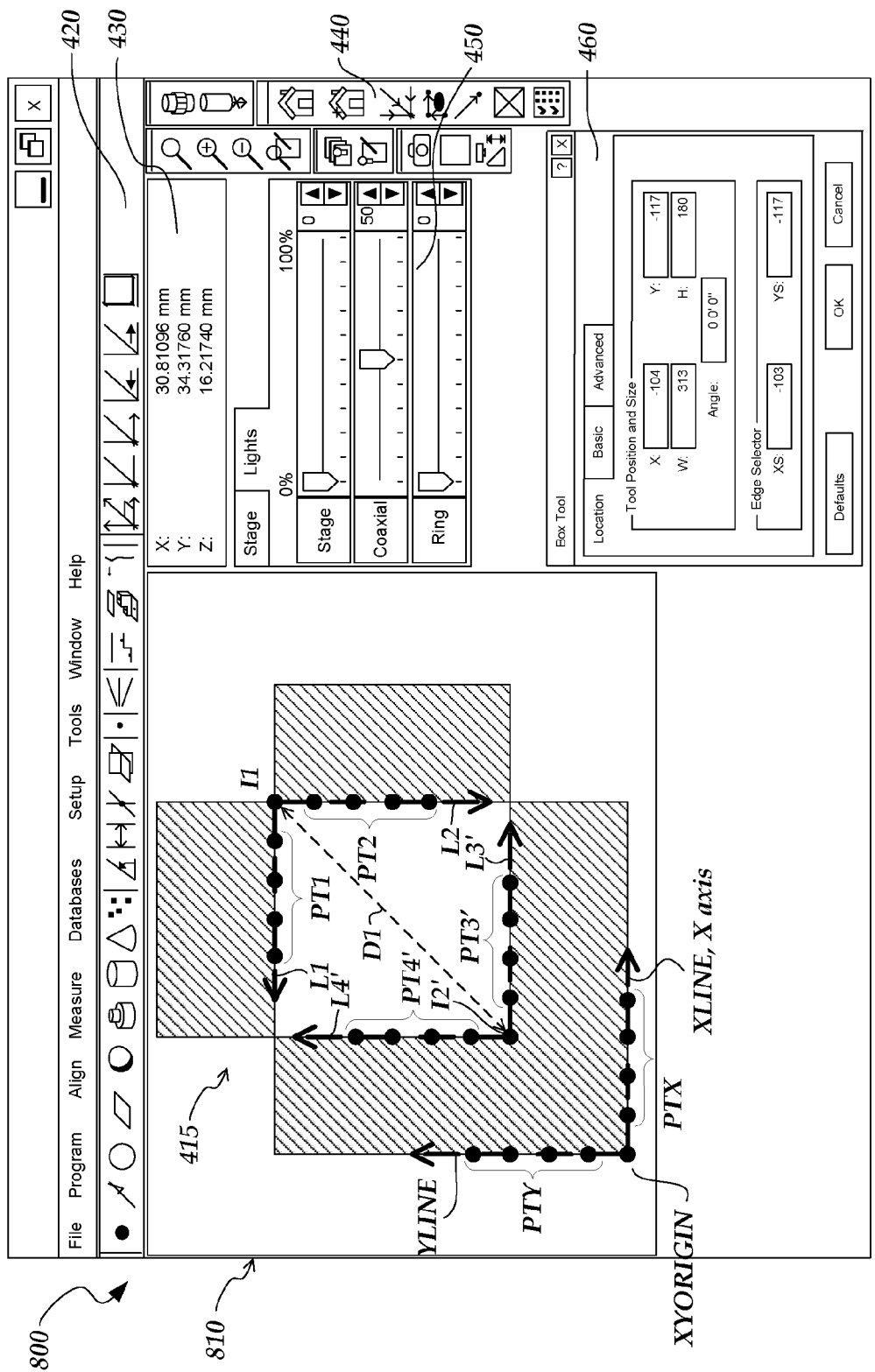
FIG. 8 is a diagram of a user interface including the workpiece on which the editing initialization block is run and on which the additional part program steps of FIG. 7 are performed.

FIG. 8 is a diagram of a user interface 800 including the workpiece 415 on which the editing initialization block 550 is run and on which the additional part program steps of FIG. 7 are performed. As shown in FIG. 8, the running of the editing initialization block 550 has reestablished the locations of the lines XLINE and YLINE, and the point XYORIGIN on the workpiece 415. More specifically, the step representations have been run so as to utilize box tools to reestablish the locations of the edge points PTX and PTY on the workpiece 415, from which the locations of the lines XLINE and YLINE and the point XYORIGIN have been redetermined. In accordance with the initial part program step representations 351-357, the correct determination of the locations of these features ensures the accuracy of the location and orientation of the workpiece 415 for purposes of adding additional part program steps. In other words, if the workpiece 415 has been inadvertently moved on the stage since the time when the workpiece program 310 was last saved, the running of the editing initialization block 550 would reestablish the correct location and orientation of the workpiece 415 for the purpose of adding further part program steps.

In contrast, in one embodiment, the initial part program steps 361-364 in the remaining steps block 560, which are not editing initialization steps, are not run in the same manner. Instead, in certain implementations, estimated sets of points PT3' and PT4' may be provided based on the relative locations of those points as determined from the initial performance of the part program steps 351-364 as illustrated in FIG. 4. In other words, the relative locations of the points PT3 and PT4 in FIG. 4 (e.g., as referenced to the point XYORIGIN) are saved when the part program 310 is initially performed and saved. Thereafter, when the part program 310 is recalled for editing and the editing initialization block 550 is run so as to reestablish the location of the point XYORIGIN as shown in FIG. 8, rather than also reestablishing the locations of the points PT3 and PT4, the previously saved relative locations to the point XYORIGIN are used to determine the locations of the estimated points PT3' and PT4'.

In other words, the locations of the estimated points PT3' and PT4' may not be based on the running of the sub-steps 361A, 361B, and 362A, all of which require hardware interaction and edge detection and would take a relatively long time to perform. In one embodiment, any sub-steps which are not in the editing initialization block and which would generally require certain designated time-consuming operations (e.g., hardware interactions such as moving the stage, edge detection, focusing, lighting changes, pattern matching, etc.) are not performed. Instead, any resulting data (e.g., redetermined edge points, etc.) that would have been provided is based on estimated data (e.g., the locations of the estimated points PT3' and PT4' relative to the point XYORIGIN). As noted above, the correct location of the point XYORIGIN has been reestablished by running the editing initialization block 550.

It will be appreciated that by not running certain designated time consuming sub-steps, significant time savings may be achieved. This is due to the fact that such processes may take a relatively long time to perform, particularly in comparison to processes which only require calculations to be performed by the controller of the machine vision system. It will be appreciated that while in the example of FIG. 7 only a few such sub-steps (e.g., sub-steps 361A, 361B, and 362A) of this type have been illustrated, in a more detailed part program, significantly more sub-steps of this type may be utilized, for which the time savings may be significant.

In one embodiment, the sub-steps 361C and 362B (which do not require relatively time-consuming operations and only require the relatively fast processing of the controller of the machine vision system to utilize the estimated points PT3' and PT4' to establish the locations of the estimated lines L3' and L4') may still be run when the editing initialization block 350 is run. Similarly, the additional step representation 364 (which only requires the relatively fast processing of the controller) may also be run to determine the estimated intersection point I2' at the intersection of the estimated lines L3' and L4'. It will be appreciated that the calculations performed by the sub-steps 361C, 362B and 364 are all of a type that can be performed relatively quickly on the estimated edge points PT3' and PT4', without requiring significant time or input from the user. Thus, certain portions of the initial part program steps 361-364 in the remaining steps block 560 may also be run (e.g., to establish certain additional part features that may be used for additional part program step measurements) when the editing initialization block 550 is run.

With regard to the additional part program step representations 771-774 that are added to the part program 310 so as to create the edited part program 710, the specific operations of the step representations will also be described with respect to FIG. 8. As shown in FIG. 8, the step representation 771 measures a line L1. More specifically, the sub-steps 771A and 771B indicate that a user sets up and utilizes a box tool to determine the edge points PT1, which are then utilized by the sub-step 771C to define the line L1. Similarly, the step representation 772 measures a line L2, wherein the sub-step 772A indicates that the user utilizes a box tool to determine the edge points PT2, which are then utilized by the sub-step 772B to define the line L2.

The step representation 773 determines an intersection point I1 at the intersection of the lines L1 and L2. The step representation 774 determines a distance D1 between the intersection point I1 and the estimated intersection point I2' that was determined at the step representation 364. It will be appreciated that the step representation 774 thus illustrates how a new measurement of the distance between the intersection point I1 and the estimated intersection point I2' may rely on the estimated positions provided after the running of the editing initialization block 550. More specifically, the location of the estimated intersection point I2', which as described above was able to be determined relatively quickly and with a reasonable assurance of accuracy based on the running of the editing initialization block 550, can be utilized for the new distance measurement D1 to the intersection point I1.

Figure 9:
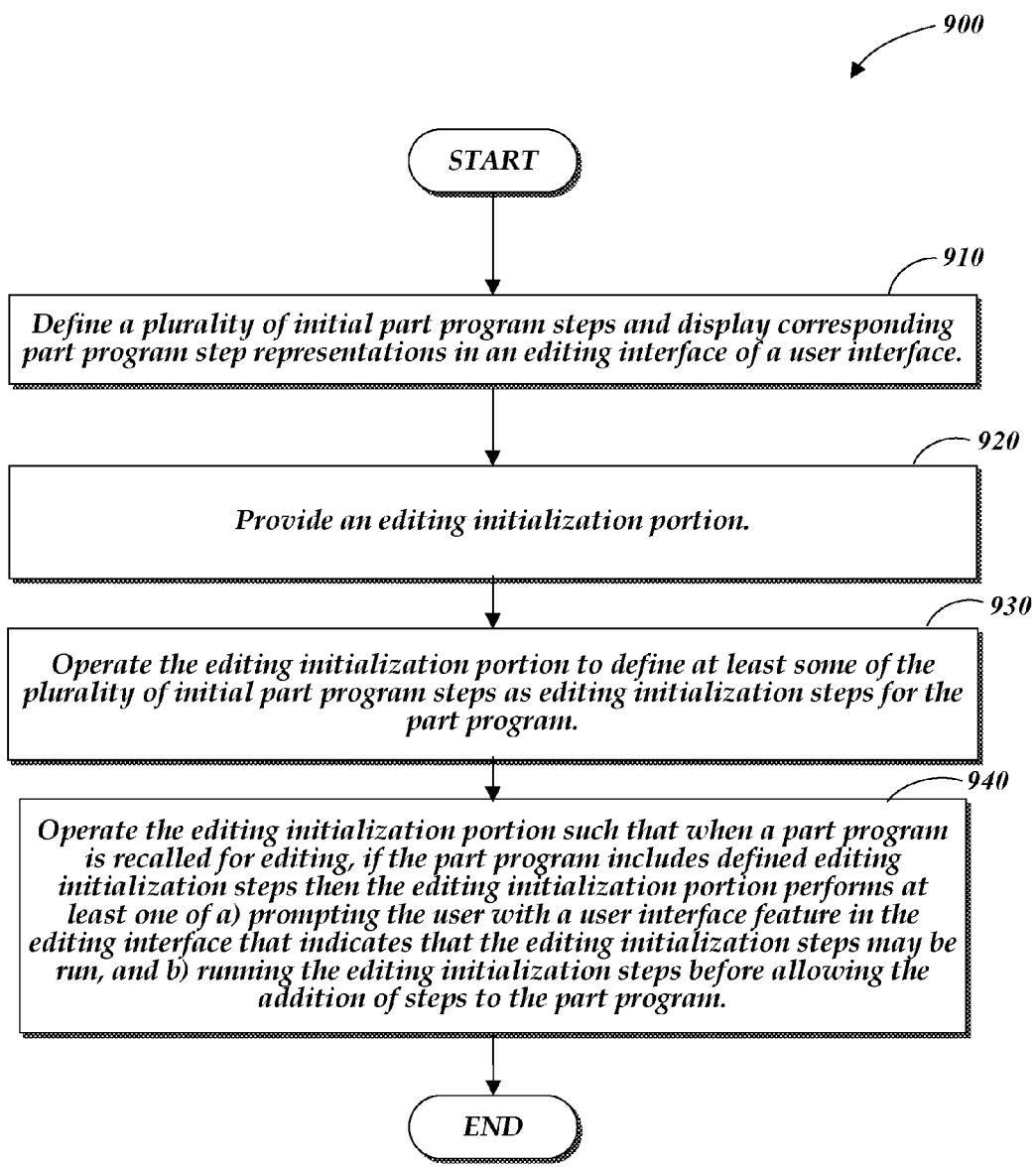
FIG. 9 is a flow diagram illustrating one embodiment of a routine for defining and utilizing an editing initialization block when editing a part program on a machine vision inspection system.

FIG. 9 is a flow diagram illustrating one exemplary embodiment of a routine 900 for defining and utilizing an editing initialization block when editing a part program on a machine vision inspection system. At a block 910, a plurality of initial part program steps are defined and corresponding part program step representations are displayed in an editing interface of a user interface. At a block 920, an editing initialization portion is provided. At a block 930, the editing initialization portion is operated to define at least some of the plurality of initial part program steps as editing initialization steps for the part program. At a block 940, the editing initialization portion is operated such that when a part program is recalled for editing, if the part program includes defined editing initialization steps, then the editing portion performs at least one of (a) prompting the user with a user interface feature in the editing interface that indicates that the editing initialization steps may be run, and (b) running the editing initialization steps before allowing the addition of steps to the part program.

While various preferred and exemplary embodiments of the invention have been illustrated and described, it will be appreciated that various changes can be made therein without departing from the spirit and scope of the invention.

The invention claimed is:

1. A method for editing a part program on a machine vision inspection system comprising:
providing a machine vision inspection system including an imaging portion, a stage for holding one or more parts in a field of view (FOV) of the imaging portion, a motion control portion that moves the imaging portion relative to the stage, a display that displays a user interface (UI), and a controller;
defining a plurality of initial part program steps and displaying corresponding part program step representations in an editing interface of the user interface;
providing an editing initialization portion;
operating the editing initialization portion to define at least some of the plurality of initial part program steps as editing initialization steps for the part program, wherein executing the defined editing initialization steps operates the machine vision inspection system to establish a predetermined condition for subsequent editing of the part program; and
operating the editing initialization portion such that when a part program is recalled for editing, the recalled part program is checked for defined editing initialization steps, and if the recalled part program includes defined editing initialization steps, then the editing initialization portion performs one of (a) prompting the user with a user interface feature in the editing interface that indicates that the editing initialization steps may be run, and (b) running the editing initialization steps before allowing addition of steps to the part program.

2. The method of claim 1, wherein the editing initialization portion can be configured by a user to define the editing initialization steps.

3. The method of claim 2, wherein the editing initialization portion comprises a drop down menu that is provided in the editing interface with a selection for defining the editing initialization steps.

4. The method of claim 3, wherein the drop down menu further includes a selection for performing at least one of (a) redefining the editing initialization steps, or (b) undoing the prior defining of the editing initialization steps.

5. The method of claim 2, wherein the editing initialization portion comprises an editing initialization indicator which comprises at least one of a color bar, a delimiting pointer, or a text highlighting portion which a user may utilize to define in the editing interface which of the initial part program steps are editing initialization steps.

6. The method of claim 2, wherein the set of editing initialization steps is defined as an editing initialization block which is determined by the user indicating the last initial part program step that is an editing initialization step.

7. The method of claim 2, wherein if the editing initialization portion comprises a type of editing initialization indicator which indicates in the editing interface which of the steps are the editing initialization steps, then when the part program is recalled for editing, a similar editing initialization indicator is provided in the editing interface to indicate the editing initialization steps.

8. The method of claim 1, wherein the user interface feature indicating that the editing initialization steps may be run comprises a pop-up block which asks the user whether or not the editing initialization steps should be run.

9. The method of claim 1, wherein the user interface feature indicating that the editing initialization steps may be run is automatically provided to the user at a time when the part program is recalled and an indication is made that additional part program steps are to be added.

10. The method of claim 1, wherein the editing initialization steps comprise part program steps that move the imaging portion relative to the stage.

11. The method of claim 10, wherein the editing initialization steps comprise part program steps that determine at least one of an origin coordinate or an orientation of the part that is used as a reference for measuring other features on the part.

12. The method of claim 1, wherein any portions of any initial part program steps that would otherwise perform certain designated processes except that they are not editing initialization steps are not run.

13. The method of claim 12, wherein the designated processes comprise one or more of hardware interactions, moving the imaging portion relative to the stage, edge detection operations, lighting adjustment operations, focusing operations, and pattern matching.

14. The method of claim 12, where any portions of any initial part program steps that are not editing initialization steps but do not perform any of the designated processes are still run when the editing initialization steps are run and may utilize estimated data that is related to data determined from the running of the editing initialization steps.

15. The method of claim 1, wherein the editing initialization steps comprise initial part program steps that will reestablish a part coordinate system for the part, so as to compensate for any inadvertent movement of the part on the stage since the last part program steps were performed.

16. The method of claim 1, wherein when a part program is recalled for editing and the editing initialization steps are run, at least some of the data that would have been obtained by one or more of the initial part program steps that are not editing initialization steps and which therefore are not run in the same manner is instead based on the data obtained from the editing initialization steps.

17. A machine vision inspection system comprising:
an imaging portion, a stage for holding one or more parts in a field of view (FOV) of the imaging portion, a motion control portion that moves the imaging portion relative to the stage, a display that displays a user interface (UI), and a controller, the controller including a computer-executable program that performs steps comprising:
defining a plurality of initial part program steps and displaying corresponding part program step representations in an editing interface of the user interface;
providing an editing initialization portion;
operating the editing initialization portion to define at least some of the plurality of initial part program steps as editing initialization steps for the part program, wherein executing the defined editing initialization steps operates the machine vision inspection system to establish a predetermined condition for subsequent editing of the part program; and
operating the editing initialization portion such that when a part program is recalled for editing, the recalled part program is checked for defined editing initialization steps, and if the recalled part program includes defined editing initialization steps, then the editing initialization portion performs one of (a) prompting the user with a user interface feature in the editing interface that indicates that the editing initialization steps may be run, and (b) running the editing initialization steps before allowing the addition of steps to the part program.

18. The machine vision inspection system of claim 17, wherein the editing initialization portion comprises an editing initialization indicator portion which provides indicators that a user may utilize to define in the editing interface which of the initial part program steps are editing initialization steps.

19. The machine vision inspection system of claim 17, wherein the editing initialization steps comprise part program steps that move the imaging portion relative to the stage.

20. The machine vision inspection system of claim 19, wherein when a part program is recalled for editing and the editing initialization steps which move the imaging portion relative to the stage are run, at least some of the data that would have been obtained by one or more of the initial part program steps that would have moved the imaging portion relative to the stage except that they are not editing initialization steps and which are therefore not run is instead based on the data obtained from the editing initialization steps which did move the imaging portion relative to the stage.

* * * * *